United States Patent
Collet et al.

(10) Patent No.: US 9,097,519 B2
(45) Date of Patent: Aug. 4, 2015

(54) METHOD FOR MOUNTING AN ANGULAR DISPLACEMENT DETECTOR AND DETECTION DEVICE PROVIDED WITH CORRESPONDING MOUNTING MEANS

(75) Inventors: Michel Collet, Toulouse (FR); Didier Puech, Toulouse (FR); Xavier Bajul, Calmont (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 340 days.

(21) Appl. No.: 13/702,411

(22) PCT Filed: Jun. 14, 2011

(86) PCT No.: PCT/EP2011/002929
§ 371 (c)(1),
(2), (4) Date: Jan. 16, 2013

(87) PCT Pub. No.: WO2011/157404
PCT Pub. Date: Dec. 22, 2011

(65) Prior Publication Data
US 2013/0104406 A1 May 2, 2013

(30) Foreign Application Priority Data

Jun. 16, 2010 (FR) .................................... 10 02541

(51) Int. Cl.
*G01B 21/22* (2006.01)
*G01D 5/244* (2006.01)
*G01D 11/16* (2006.01)

(52) U.S. Cl.
CPC ............ *G01B 21/22* (2013.01); *G01D 5/24423* (2013.01); *G01D 11/16* (2013.01)

(58) Field of Classification Search
CPC ............ G01B 5/24; G01B 7/30; G01B 11/26; G01B 21/22; G01D 5/00; G01D 5/244; G01D 5/24423; G01D 11/00; G01D 11/16; G01D 11/245
USPC .......... 33/1 PT; 250/231.13, 239; 324/207.25
See application file for complete search history.

(56) References Cited

U.S. PATENT DOCUMENTS 5,708,496 A    1/1998 Barnett et al.
5,859,425 A *  1/1999 Mleinek et al. .......... 250/231.13
(Continued)

FOREIGN PATENT DOCUMENTS

CN      1940488 A    4/2007
CN    101203764 A    6/2008
(Continued)

OTHER PUBLICATIONS

International Search Report, dated Dec. 6, 2011, from corresponding PCT application.

*Primary Examiner* — R. A. Smith
(74) *Attorney, Agent, or Firm* — Young & Thompson

(57) ABSTRACT

The object is to ensure the absence of friction between a housing supporting a sensor and a mounting arranged to support a target, and the absence of load take-up resulting from the contact and lack of precision among mounting interfaces. This involves forming, in a mounting position, a clearance between the mounting and the housing and then releasing the target mounting in the operative position of the sensor. A cylindrical recess for freely receiving with a clearance the mounting supporting the reference element serving as a target and which is mountable on the shaft, is provided in the housing which supports the sensor and which is attachable to the stationary part. Removable locking elements provided between the mounting and the housing maintain the latter in an initial position when the locking elements are operative and, when inoperative, release the mounting mounted on the rotary shaft from the housing.

12 Claims, 5 Drawing Sheets

(56) References Cited

U.S. PATENT DOCUMENTS

Figure 1:
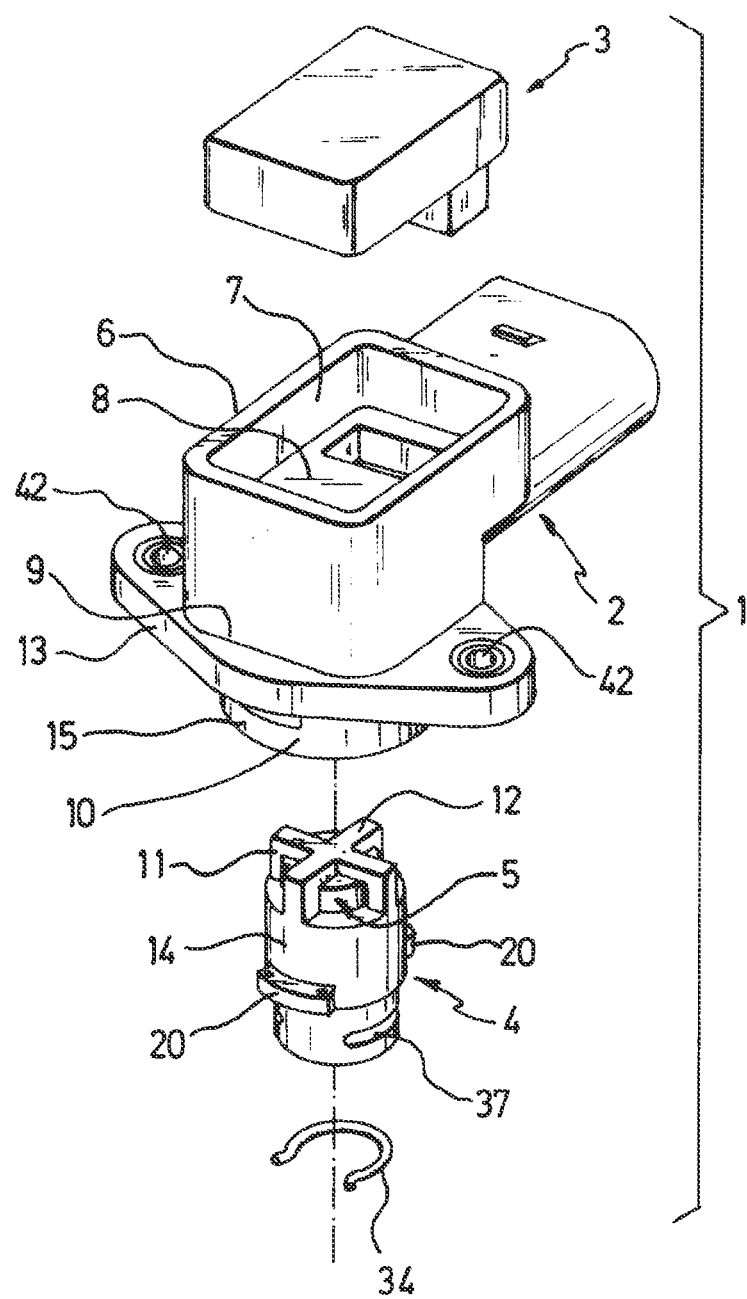

| | | |
|---|---|---|
| 6,452,160 B1 | 9/2002 | Mitterreiter |
| 6,462,442 B1 | 10/2002 | Braun et al. |
| 7,601,948 B1 * | 10/2009 | Setbacken et al. ....... 250/231.13 |
| 2004/0094351 A1 | 5/2004 | Higashi et al. |
| 2006/0255251 A1 | 11/2006 | Jones |
| 2007/0074583 A1 | 4/2007 | Santos et al. |
| 2008/0178448 A1 | 7/2008 | Montagnoni et al. |
| 2010/0117633 A1 | 5/2010 | Adams et al. |
| 2012/0187942 A1 * | 7/2012 | Lee .......................... 324/207.25 |

FOREIGN PATENT DOCUMENTS

| | | |
|---|---|---|
| CN | 201662386 U | 12/2010 |
| EP | 0973014 A1 | 1/2000 |
| EP | 1 724 557 A2 | 11/2006 |

* cited by examiner

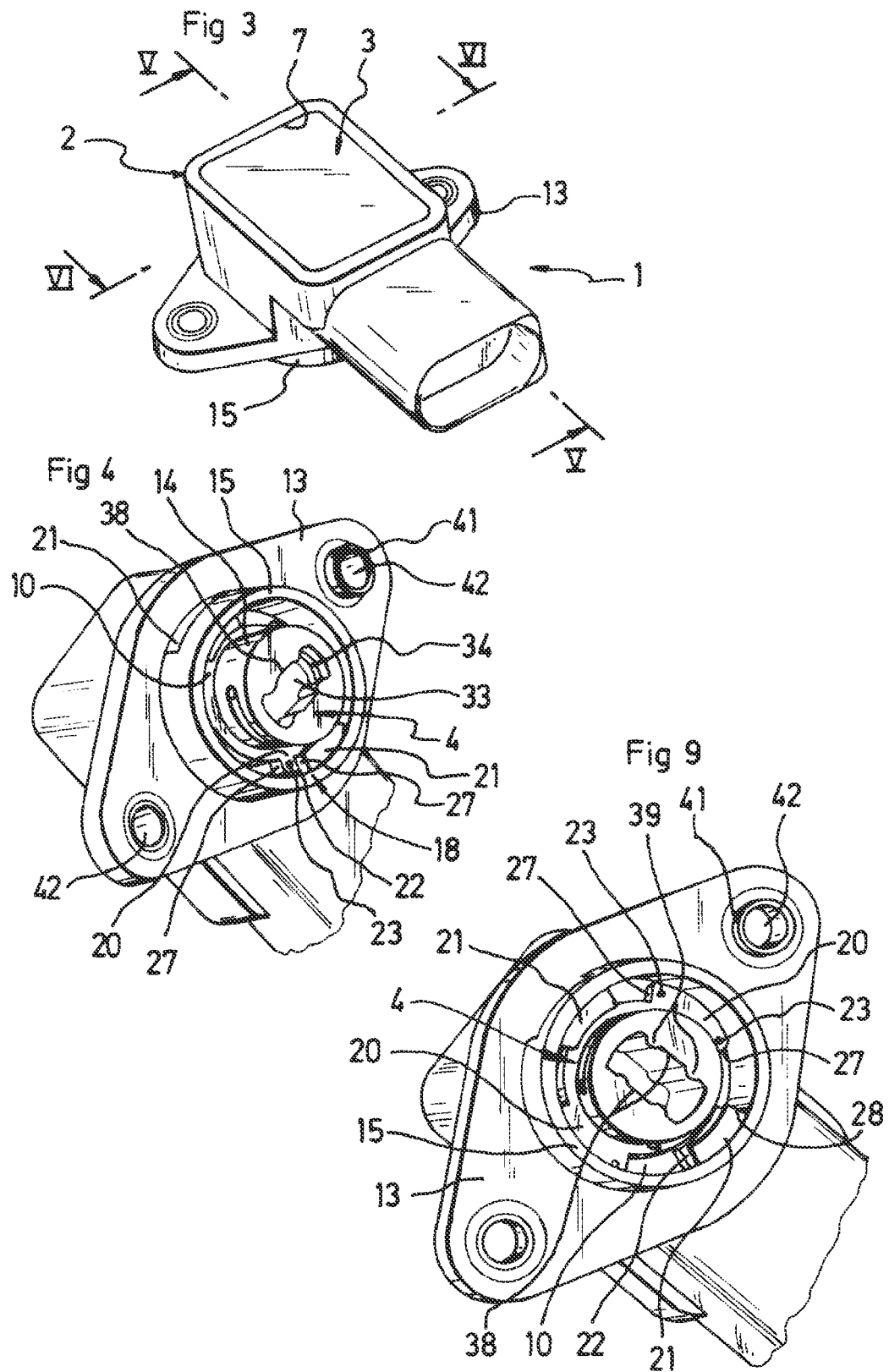

METHOD FOR MOUNTING AN ANGULAR DISPLACEMENT DETECTOR AND DETECTION DEVICE PROVIDED WITH CORRESPONDING MOUNTING MEANS

The present invention relates to a method for mounting an angular displacement detector. It also relates to a device for detection of a rotating or rotary shaft with respect to a fixed element, equipped with mounting means capable of implementing this method.

In one particular application, albeit non-exclusive, the rotary shaft can be the shaft of a gearbox ending at the gear-change lever and the fixed element the casing of the gearbox. The device thus determines the position occupied by the lever (in other words its angular variation) based on which specific pieces of information are sent to a central processing unit which can deliver, for example, operational setpoints adapted to this position particular to various mechanisms of the vehicle.

Other applications of the device of the invention are of course within its scope of application (for example on engines) wherever the need is to sample a rotational movement of a shaft (in the wider sense of the term) with respect to a fixed element (also to be taken in the wider sense).

Detection devices such as defined hereinabove are known and generally comprise:
- a housing in which a sensor is arranged and which is capable of being mounted onto the fixed element; and
- a support which carries a localization element forming a target facing the sensor and which cooperates with the housing, the support being able to be mounted onto the rotary shaft.

Although these devices are widely used owing to the link between the target and the sensor within a common device, they nevertheless have drawbacks notably with regard to their design and the measurements taken.

Indeed, since the support and the housing are assembled together, the mobile target linked to the rotary shaft by its support is in contact with the fixed sensor. This generates friction and load bearing forces due to the contacts and to the imprecisions in the mounting interfaces between the support of the target linked to the rotary shaft and the housing of the sensor linked to the fixed element. These frictional forces can lead to the formation of burrs on the target interfering with the operation of the device since this unavoidably results in an angular delay on the target-sensor measurement and, consequently, an inaccurate measurement and a premature wearing of the detection device.

Furthermore, these frictional forces also lead to problems of thermal expansion between the various components of the device, generally composed of plastic materials that are sensitive to heat.

Of course, in order to overcome the friction issues, other known detection devices completely dissociate the target from the sensor housing and directly mount the target onto the rotary shaft and the housing of the sensor onto the fixed element. However, this type of embodiment has other issues such as problems with mounting the target onto the rotary shaft or problems of geometry (concentricity, etc.) between the components.

The aim of the present invention is to guarantee the absence of friction between the housing and the support and the absence of load-bearing forces due to the contacts and to the inaccuracies in the mounting interfaces. For this purpose, the solution of the invention is to create, in an assembled position, a clearance between the support and the housing then to free up the target support in the operational position of the sensor.

More precisely, the subject of the invention is a method for mounting an angular detector, the detector comprising a detection sensor arranged within a housing to be attached to a fixed element and a target to be detected carried in a support to be attached to a rotary shaft. The method consists, in an initial position before and during the mounting of the support onto the rotary shaft, in maintaining the support with a clearance within the housing, then in displacing the support with respect to the housing so that the sensor reaches an operational position for detection of the target.

This solution guarantees optimum measurements between the target and the sensor and hence virtually zero wear of the device.

Advantageously, the housing and the support are axially fixed onto the fixed element and the rotary shaft, respectively, the displacement of the support being rotational between the initial position and the operational position.

The invention also relates to a device for detection of an angular displacement of a rotary shaft with respect to a fixed element, equipped with means allowing the implementation of the method defined hereinabove. Such a device, of the type previously defined, is noteworthy according to the invention in that, within said housing, a cylindrical accommodation is formed for receiving said target holder support, in that said target holder support is freely located with clearance within said accommodation, and in that retractable blocking means are provided in said accommodation between said support and said housing in such a manner that, in an initial position before and during the mounting of the target holder support onto the rotary shaft, the blocking means are active and maintain said support assembled in the accommodation of said housing, and that, in an operational position, after the mounting of said support at the end of said rotary shaft and under the action of a relative displacement of the housing with respect to said support, said blocking means are disabled and free up said support with respect to said housing, by isolating it from the latter.

Thus, thanks to the invention, after its mounting onto the rotary shaft, the support is removed from the blocking means and from the accommodation of the housing, such that the contacts between the target holder support and the housing with integrated sensor are eliminated. In this way, the friction between the latter no longer exists, thus guaranteeing reliable and precise measurements and an improved lifetime of the device by the absence of wear.

Furthermore, since the target holder mobile support is separated from the fixed sensor-holder housing, owing to the absence of direct contacts between the latter, the problems of thermal expansion are no longer existing.

Advantageously, said retractable blocking means are of the axial and rotary type, immobilizing said target holder support within the accommodation of said housing when they are active. Thus, the initial position of the device, during its transport and before and during the mounting of the target holder support, is conserved and the device in itself is intact.

In one preferred embodiment, with regard to the axial immobilization, said retractable blocking means are defined by external spigots forming a radial protrusion from the wall of said support and are engaged in corresponding slots provided in internal lateral tabs forming a radial protrusion from the wall bounding said accommodation. In particular, two radial tabs with slots and two external radial spigots respectively come, in a diametrically opposing fashion, from the wall of said accommodation and from the wall of said support.

With regard to the immobilization in rotation, said retractable blocking means may be defined by elastically deformable bosses formed on at least one of said spigots and separated from one another by a suitable angle so as to be respectively applied on either side of the lateral edges of said corresponding internal radial tab of the accommodation, after the engagement of said spigots in the slots of said tabs.

The simple design of the blocking means allows, on the one hand, the support axial positioning to be maintained with respect to the housing through the spigot-tab contacts and, on the other hand, their mutual rotational positioning to be maintained through the boss-tab contacts. The removal of said means by the relative rotation of the housing with respect to the support allows the friction points provided by the elastic bosses and the spigots to be angularly offset from the tabs.

Advantageously, said target is installed in one of the ends of said support, turned toward the sensor and taking the form of a cage inside of which said target is located. Thus, the caged end of the support protects the target.

According to another feature of the device, said support is attached, at its end opposite to that carrying said target, to said rotary shaft using a connection pushed on by force.

In particular, said connection is defined by a profile with a flattened end-plug terminating said rotary shaft and by a profile with an axial opening formed in said end of the support and substantially complementary to said end-plug in order to push fit by force into the latter.

In order to provide an indication of the predetermined axial positioning between the support and the rotary shaft, an elastic ring is provided in said support which is engaged in a groove formed in said end-plug of the rotary shaft when said pushed on support has reached the desired axial position.

Furthermore, said housing comprises a connection base plate perpendicular to said cylindrical accommodation which is able to cooperate with said fixed element via fixing elements, in an operational position after the assembly of said support at the end of said shaft and displacement of said housing with respect to the support.

Figure 2:
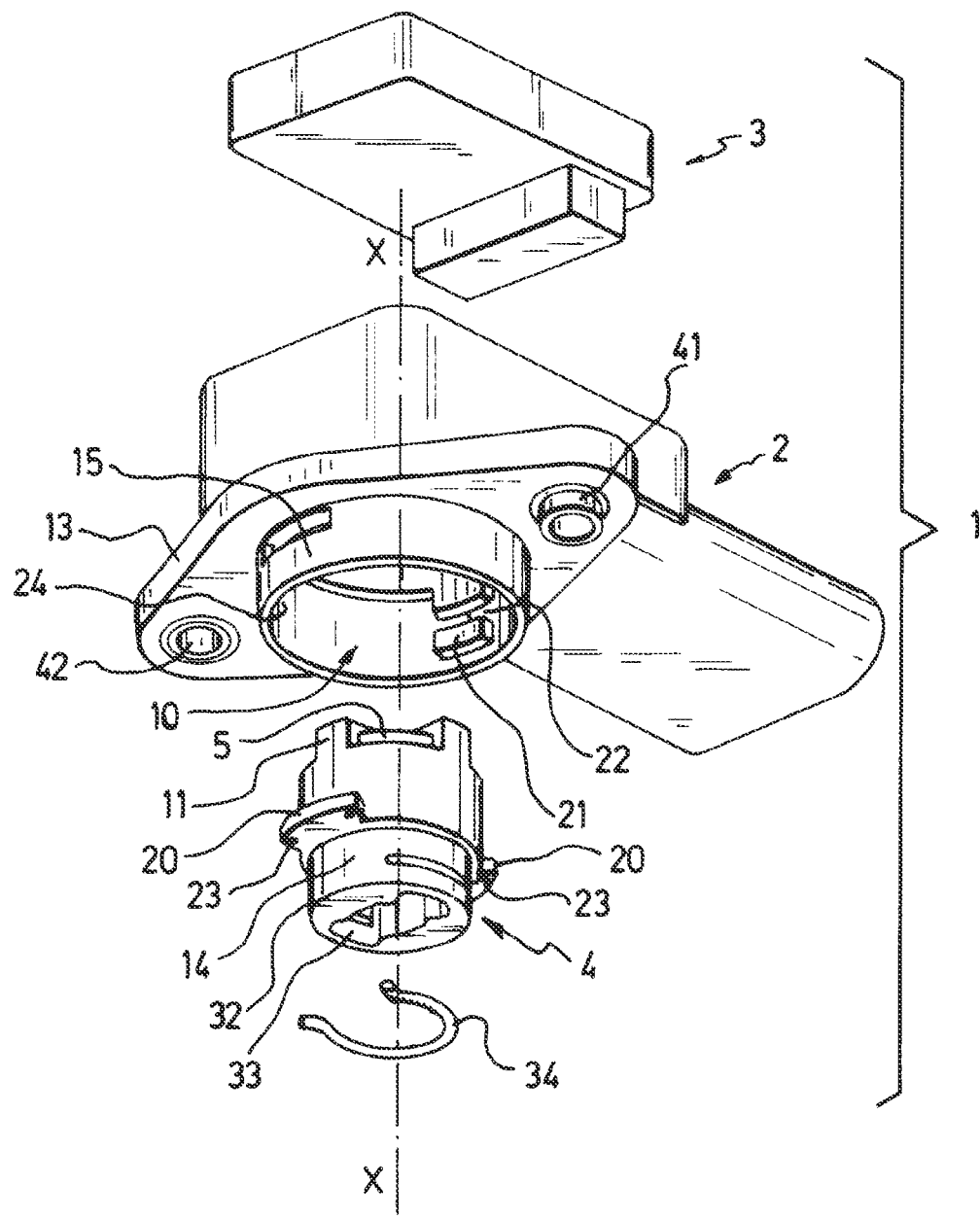
Figure 5:
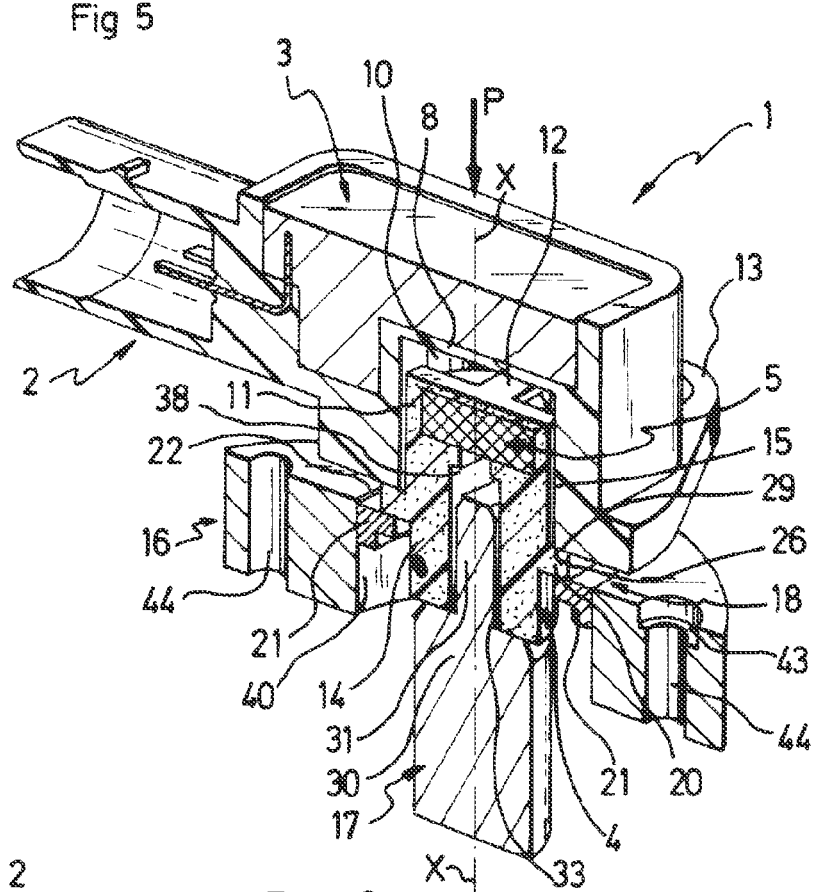
Figure 6:
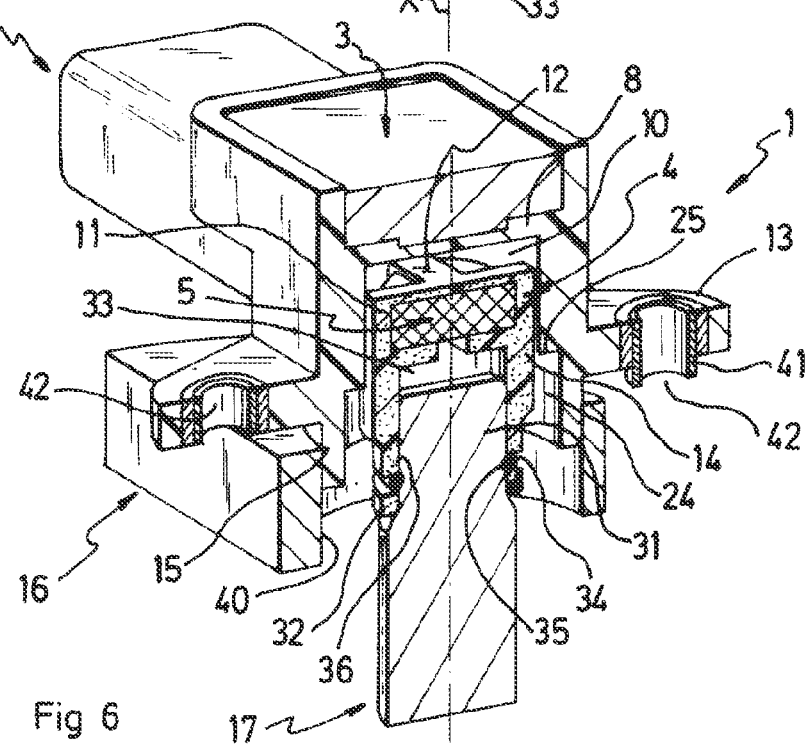
Figure 7:
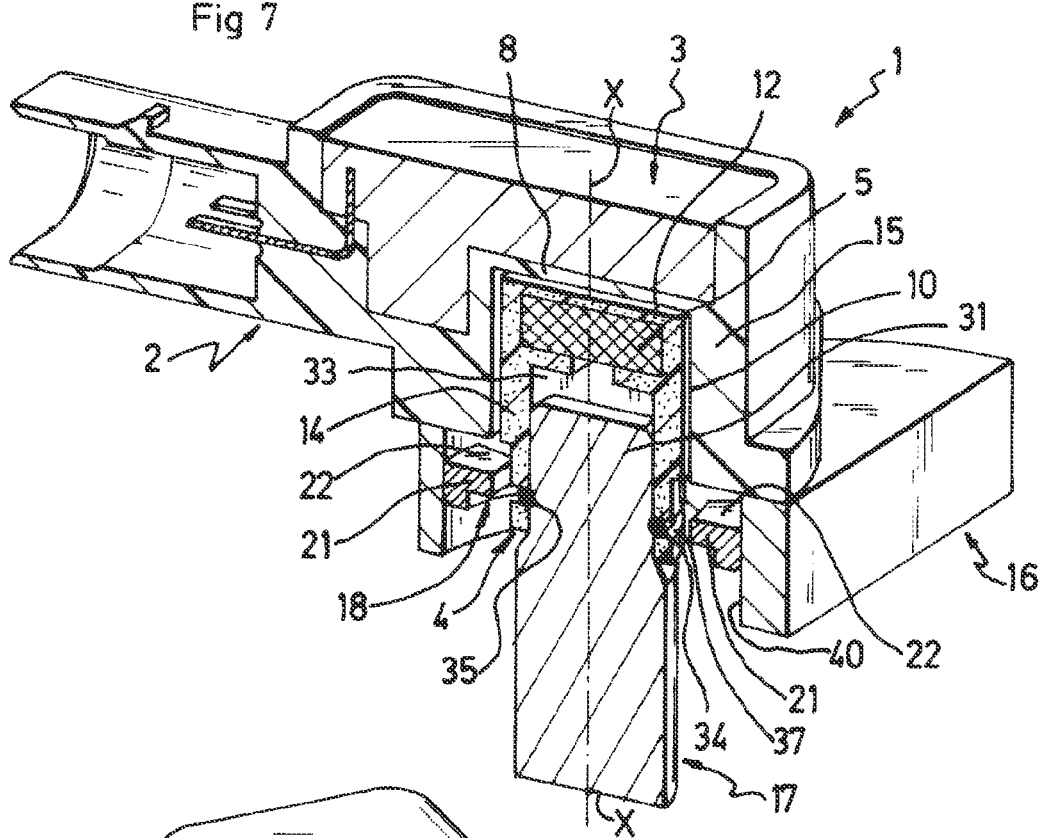
Figure 8:
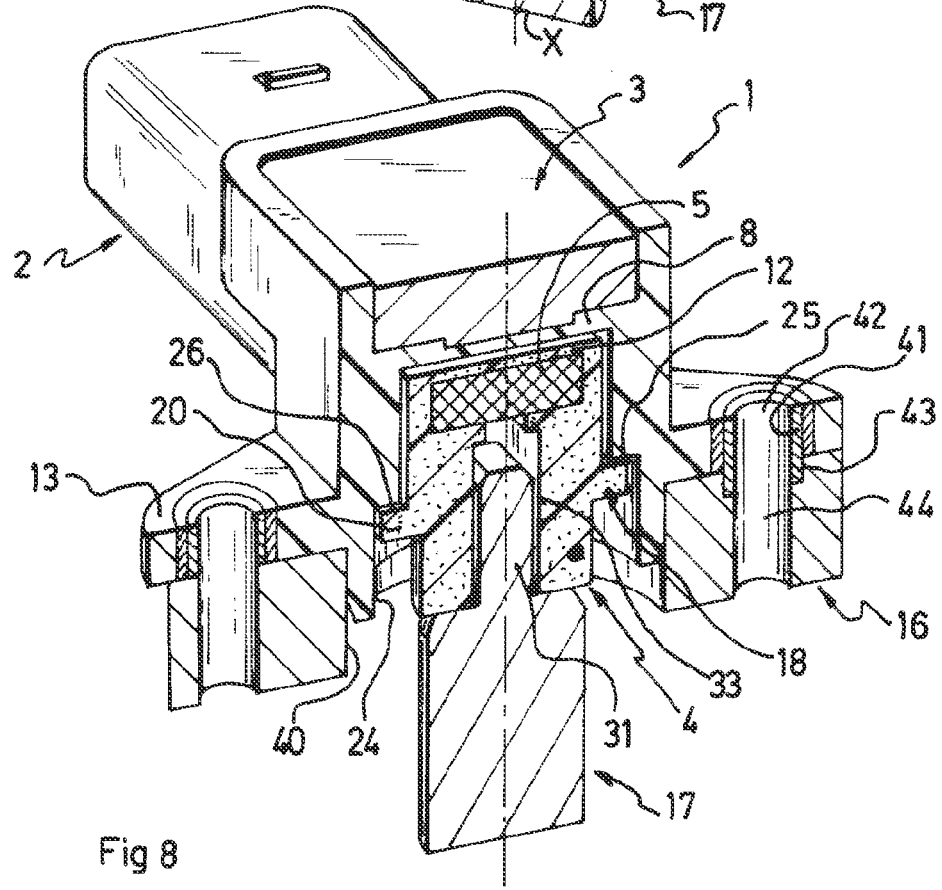

The implementation of the invention will be clearly understood and other features and advantages will become apparent in light of the detailed description that follows, with reference to the appended figures which respectively show:

FIGS. 1 and 2, respective exploded perspective views of the top and of the bottom of one embodiment of the angular detection device according to the invention;

FIGS. 3 and 4, top and bottom views of said assembled device before mounting;

FIGS. 5 and 6, respective longitudinal and transverse cross-sectional views of the device through the planes V-V and VI-VI in FIG. 3 in an initial position of the latter, with the target holder support engaged on the rotary shaft and the housing separated from the fixed element;

FIGS. 7 and 8, respective longitudinal and transverse cross-sectional views of the device analogous to the preceding ones but in an operational position of the latter, with the support engaged on the shaft and the housing fixed to the fixed element; and FIG. 9, a top view of said device in an operational position, after mounting, with the rotary shaft and the fixed element not shown.

In these figures, identical references denote similar elements.

The angular detection device 1 shown in FIGS. 1 to 4 mainly comprises a housing 2 with a measurement sensor 3 and a support 4 carrying a localization element 5 forming a target and denoted accordingly in the following part.

In particular, the housing 2 has a substantially parallelepiped shape, in one of the large faces 6 of which is formed a semi-open accommodation 7 with a rectangular cross-section for receiving the measurement sensor 3. With regard to the sensor, this can be of the magnetic type and it is fixed to the base 8 of the rectangular accommodation by any suitable known means, not shown here. The electrical connection of the sensor 3 to a power supply is not shown either.

Facing the rectangular semi-open accommodation 7, in the other large opposing face 9, a semi-open cylindrical accommodation 10 is formed with axis X and of circular cross-section, in which the target 5 holder support 4 is received. Thus, the same base 8 of the housing 2 is common to the two blind accommodations 7, 10, the cylindrical accommodation 10 with axis X being perpendicular to the extended shape of the housing, as is shown in FIGS. 1 and 2.

The target 5, such as a magnet, is pre-assembled and is mounted in the support 4 made of synthetic material and of circularly symmetric form. More particularly, the target is held in one 11 of the ends of the latter, turned toward the common base 8 of the housing, so as to be facing the measurement sensor 3. This end 11 takes the form of a cage 12 thus protecting the target 5 from direct contact with the base of the accommodation. As shown in FIGS. 4-6, the support 4 is arranged in the cylindrical accommodation 10 of the housing 2 in such a manner as to be mounted freely floating in the latter. A functional clearance is thus provided between the side wall 14 of the support 4 and the side wall 15 of the housing 2 bounding the cylindrical accommodation 10. In FIGS. 1 to 9, it can furthermore be seen that the side wall 15 of the accommodation is extended, perpendicularly to the axis X, by a base plate 13 in the shape of a lozenge, used to fix the housing onto the fixed element, as will be seen hereinbelow.

In the initial position of the device 1, in other words before the housing 2 is mounted onto a fixed element 16 (for example, the casing of a gearbox, cf. FIG. 5), whereas the support 4 is designed to be mounted onto a rotary or rotating shaft 17 (such as the control shaft of the gear lever, cf. FIG. 5), retractable blocking means 18 are provided and are then active for immobilizing, both axially and in rotation, the target 5 holder support 4 in the accommodation of the housing. In this way, the device 1 can be transported and/or manipulated without risk for as long as its final mounting has not been effected (housing on fixed element) where it then occupies an operational position to be defined hereinbelow.

For this purpose, as is more particularly shown in FIGS. 2, 4-6, both the axial and rotational blocking means 18 are defined, in this embodiment, by the cooperation of radial spigots 20 with tabs 21 having radial slots 22 for the axial immobilization of the support 4 along the X axis of the accommodation 10 in the housing 2, and by bosses or similar 23 preventing the rotation of the support 4 with respect to the tabs of the accommodation of the housing 2.

For example, two diametrically opposing tabs 21 come from the side wall 15 of the cylindrical accommodation 10 and protrude radially toward the inside of the accommodation. In these two opposing tabs 21, running in parallel along the side wall 15, the radial slots 22 are formed in which the two radial spigots 20 are able to be engaged, which slots themselves come from the side wall 14 of the rotational support 4 and which radially protrude toward the outside. These two external radial spigots 20 are of course diametrically opposing one another and their thickness corresponds substantially to that of the radial slots 22 in such a manner as to be adjustable, for example by slight friction, in the slots of the tabs when the latter are inserted.

In addition, the spigots 20 are mounted so as to be able to freely rotate in a widened cylindrical part 24 terminating the cylindrical accommodation 10 and from which the internal radial tabs come. A shoulder 25 separates the widened part 24 from the rest of the accommodation 10 (cf. FIG. 6).

In order that the spigots 20 axially immobilized in the tabs 21 with slots 22 conserve their position, they should be immobilized in rotation and, for this purpose, the bosses 23 of the blocking means are elastically deformable and are provided on the transverse faces 26 of the spigots 20, in the neighborhood of their lateral edges 27. In addition, the radial spigots 20 are designed to cover a slightly greater angular sector than that of the tabs 21 with slots 22. Thus, after the mounting of the support 4 in the accommodation 10, then its rotation in order to bring the spigots 20 into the slots 22 of the tabs 21, said elastic bosses 23 sit proud from the tabs and spontaneously indicate the correct angular position of the support, by respectively applying themselves on either side of the lateral edges 28 of the tabs with slots. Thus, the immobilization in rotation of the target holder 5 support 4 with respect to the accommodation 10 of the housing 2 is guaranteed by these elastically deformable bosses 23 forming friction points. The rotational support 4 is thus located coaxially to the X axis of the cylindrical accommodation 10.

The axial position of the radial spigots 20 on the target holder 5 support 4 and of the radial tabs 21 with slots in the cylindrical accommodation 10 of the housing is of course determined in such a manner that the end 11 of the support 4 in the cage 12 remains separated by a gap from the common base 8 of the housing, notably when the device 1 goes from the initial position to the operational position. In FIGS. 4, 5 and 6, the radial clearance provided between the side wall 14 with spigots 20 of the support 4 and that 15 with a shoulder 25 of the cylindrical accommodation 10 is also noted.

Thus, by these active blocking means 18, the device 1 occupies an initial fixed position, guaranteeing the protection of the sensor and of the target during handling operations and until the mounting of the support 4.

In the example illustrated, the target holder 5 support 4 is designed to be mounted at the end of the rotary shaft 17 and, in this embodiment, the assembly uses a push-on attachment. In particular, as shown in FIGS. 5 and 6, the end 30 of the shaft 17 is terminated in a flattened end-plug 31 with a rectangular transverse cross-section, and the end 32 of the support in question, opposite to that 11 carrying the target 5, has a profile with an axial opening in the form of a slot 33, substantially corresponding to the rectangular shape of the end-plug. Thus, the flattened end-plug 31 of the shaft and the axial opening 33 of the support forms the push-fit attachment by force.

In order to mark the position of the axial attachment between the end-plug 31 and the opening 33, an elastic split ring 34 is provided, for example in a groove 37 (cf. FIG. 7) of the side wall 14 of the support coming out in the axial opening 33. During the mounting of the support, this elastic ring 34 is engaged in a corresponding radial groove 35 provided in the small sides 36 of the rectangular end-plug 31 of the shaft 17 (cf. FIG. 6).

In the initial position of the device 1, shown in FIGS. 4-6, the target holder 5 support 4 is arranged to be floating, with clearance in the receiving accommodation 10 of the housing 2. It is held there axially and in rotation by the blocking means 18 which are now active, the spigots 20 of the support being taken up in the slots 22 of the radial tabs 21 and angularly blocked by the bosses 23.

The device 1, with the housing containing the sensor 3 and the target support 5 thus assembled and held with respect to one another, occupies the initial position prior to mounting providing an optimum protection for the localization element (target) and for the sensor.

When the angular detection device 1 is installed, still in the initial position, the cylindrical support 4 is presented in front of the shaft 17 onto which it is to be mounted. For this purpose, the slotted axial opening 33 is mounted by force into the flattened end-plug 31 of the shaft until the elastic ring 34 is engaged in the receiving groove 35 of the end-plug indicating the correct mounting position of the support at the chosen location. During the assembly, the axial force P (FIG. 5) exerted by the operator on the housing is transmitted to the support to be inserted and gripped by the contact of the corresponding edges 29 bounding the slots 22 of the tabs 21 on the faces 26 of the radial spigots 20 in question.

It can be noted, in FIG. 4, that the introduction by force is not directly effected via the plane surfaces 38 bounding the opening 33 with those of the end-plug 31, but by parallel lines 39 (cf. FIG. 9) protruding from the surfaces 38 so as to avoid binding between the support and the end-plug and to create a certain elasticity while at the same time providing a slip-fitting with an acceptable force.

The support 4 is thus immobilized with respect to the end-plug 31, and centered coaxially with respect to the rotary shaft 17.

Simultaneously with the introduction of the support 4 into the end-plug of the shaft 17, that of the side wall 15 of the cylindrical accommodation 10 takes place, in a centered and adjusted manner, into the axial passage 40 provided in the fixed element 16 (gearbox casing) and accommodating said rotary shaft 17.

At this time, as is shown in FIGS. 7 and 8, the housing 2 of the device is now rotated by the operator by around a quarter of a turn in order to angularly displace the internal radial tabs 21 of the accommodation 10 and thus distance them from the external radial spigots 20 of the fixed support 4 overcoming for this purpose the friction points defined by the elastically deformable bosses 23 of the spigots. The blocking means 18 are then disabled, and the support 4 is only carried by the rotary shaft 17 and separated from the housing 2 without making contact with the latter.

It should be pointed out that the correct orientation to be given to the housing 2, after its centering in the axial passage 40 of the fixed element, is ensured by a bush 41 inserted in one of the two holes 42 formed at opposite ends of the lozenge-shaped base plate 13 of the housing for fixing it to the fixed element. The bush is designed to cooperate with a corresponding counter-bore 43 provided in one of the mounting holes 44 in the fixed casing.

Then, the housing thus rotated 2 and centered in the passage 40 by its side wall 15 is pushed axially toward the fixed element 16, in such a manner that the bush 41 is engaged in the corresponding counter-bore 43, the holes 42-44 in the base plate 13 and in the fixed element 16 being in correspondence. After the contact of the base plate 13 with the latter, fixing mechanisms, not shown, are engaged and bolted into the holes rigidly attaching the housing 2 of the device 1 to the casing 16.

It goes without saying that, subsequent to the fixing of the base plate, the common base 8 of the housing comes close to the caged end 12 of the target, but without coming into contact with the latter, leaving a clearance gap. The same goes for the shoulder 25 of the accommodation 10 with the faces 26 of the spigots where a clearance subsists (FIG. 8)

The target holder 5 support 4 rigidly fixed to the end-plug is thus completely isolated from the housing 2 in its operational position or position of use of the device 1, without any three-dimensional contact with the housing, thus guaranteeing reliable and accurate measurements and an enhanced longevity.

The device of the invention consequently achieves the objective set, namely to detect the angular variation of a rotary shaft with respect to a fixed element, while avoiding any contact between the sensor and the localization element forming a target in operation, while at the same time being initially configured within a common device.

The invention is not limited to the embodiments described and shown.

The invention claimed is:

1. A detection device of an angular displacement of a rotary shaft (17) with respect to a fixed element (16), said device comprising:
    a housing (2) within which a sensor (3) is arranged and which is able to be mounted onto the fixed element (16), and
    a support (4) which carries a localization element forming a target (5) facing the sensor (3) and which cooperates with the housing (2), the support (4) being able to be mounted onto said rotary shaft (17),
    in such a manner that:
    within said housing (2), a cylindrical accommodation (10) is formed for receiving said target holder support (4),
    said target holder support (4) is freely located with clearance within the accommodation (10), and
    retractable blocking means (18) are provided between said support (4) and said housing (2) so that,
        in an initial position before and during the mounting of the target holder support (4) onto said rotary shaft (17), said blocking means (18) are active and maintain said support assembled (4) within the accommodation (10) of said housing (2), and that,
        in an operational position, after the installation of said support (4) at the end of said rotary shaft (17) and under the action of a relative displacement of the housing (2) with respect to said support (4), said blocking means (18) are disabled and free up said support (4) with respect to said housing (2), by isolating said support (4) from said housing (2),
    characterized in that,
    said retractable blocking means (18) are axial and rotatable immobilizing said target (5) holder support (4) in the accommodation (10) of said housing (2), when said retractable blocking means (18) are active, and in that
    said retractable blocking means (18) are defined by external spigots (20) forming a radial protrusion from a wall (14) of said support and which are engaged in corresponding slots (22) provided in internal lateral tabs (21) forming a radial protrusion from the wall (14) bounding said accommodation.

2. The detection device as claimed in claim 1, in which the two radial internal tabs (21) with the slots (22) and the two external radial spigots (20) respectively come, in a diametrically opposing fashion, from the wall (15) of said accommodation (10) and from the wall (14) of said support (4).

3. The detection device as claimed in claim 2, in which said target (5) is installed in one (11) of the ends of said support (4), turned toward the sensor and taking the form of a cage inside of which said target is located.

4. The detection device as claimed in claim 2, in which said support (4) is attached, at its end (32) opposite to that carrying said target, to said rotary shaft (17) using a connection pushed on by force.

5. The detection device as claimed in claim 2 in which said housing (2) comprises a connection base plate (13) perpendicular to said accommodation (10) and which is capable of cooperating with said fixed element (16) via fixing elements in an operational position after the assembly of said support at the end of said shaft and displacement of said housing support.

6. The detection device as claimed in claim 1, in which said retractable blocking means (18) are defined by elastically deformable bosses (23) formed on at least one of said spigots (20) and separated from one another by an angle such as to apply themselves respectively on either side of lateral edges (28) of said internal radial tab (21) of the accommodation, after the engagement of said spigots into the slots of said tabs.

7. The detection device as claimed in claim 1, in which said target (5) is installed in one (11) of the ends of said support (4), turned toward the sensor and taking the form of a cage inside of which said target is located.

8. The detection device as claimed in claim 1, in which said support (4) is attached, at its end (32) opposite to that carrying said target, to said rotary shaft (17) using a connection pushed on by force.

9. The detection device as claimed in claim 8 in which said connection is defined by a profile with flattened end-plug (31) terminating said rotary shaft (17) and by a profile with an axial opening (33) formed in said end (32) of the support (4) being substantially complementary to said end-plug in order to fit by force into the support (4).

10. The detection device as claimed in claim 9 in which, in order to provide an indication of the predetermined axial positioning between the support (4) and the rotary shaft (17), an elastic ring (34) is provided on said support, which is engaged into a groove (35) formed in said end-plug (31) of the rotary shaft when said pushed-on support (4) has reached the desired position.

11. The detection device as claimed in claim 1 in which said housing (2) comprises a connection base plate (13) perpendicular to said accommodation (10) and which is capable of cooperating with said fixed element (16) via fixing elements in an operational position after the assembly of said support at the end of said shaft and displacement of said housing support.

12. A method for mounting a device for detection of an angular displacement of a rotary shaft (17) with respect to a fixed element (16), implementing the device as claimed in claim 1.

* * * * *